(12) United States Patent
Diggins et al.

(10) Patent No.: US 8,861,837 B2
(45) Date of Patent: Oct. 14, 2014

(54) DETECTING STEREOSCOPIC IMAGES

(75) Inventors: Jonathan Diggins, Buckinghamshire (GB); Michael James Knee, Hampshire (GB)

(73) Assignee: Snell Limited, Reading, Berkshire (GB)

( * ) Notice: Subject to any disclaimer, the term of this patent is extended or adjusted under 35 U.S.C. 154(b) by 274 days.

(21) Appl. No.: 13/473,116

(22) Filed: May 16, 2012

(65) Prior Publication Data

US 2012/0294486 A1 Nov. 22, 2012

(30) Foreign Application Priority Data

May 17, 2011 (GB) .................................. 1108201.3

(51) Int. Cl.
*H04N 13/00* (2006.01)

(52) U.S. Cl.
CPC .... *H04N 13/0048* (2013.01); *H04N 2013/0074* (2013.01); *H04N 2213/007* (2013.01); *H04N 13/0059* (2013.01)
USPC .......................................... 382/154; 382/233

(58) Field of Classification Search
USPC ............... 382/154, 233; 348/43, 425.3, 426.1
See application file for complete search history.

(56) References Cited

U.S. PATENT DOCUMENTS

| 4,958,226 | A | 9/1990 | Haskell et al. ................. 358/136 |
| 5,136,377 | A | 8/1992 | Johnston et al. .............. 358/136 |
| 5,500,678 | A | 3/1996 | Puri .............................. 348/408 |
| 2002/0126221 | A1 | 9/2002 | Link .............................. 348/571 |
| 2004/0005082 | A1 | 1/2004 | Lee et al. ....................... 382/103 |
| 2010/0053306 | A1 | 3/2010 | Hirasawa et al. .............. 348/43 |
| 2010/0182404 | A1 | 7/2010 | Kuno ............................. 348/43 |
| 2010/0303340 | A1 | 12/2010 | Abraham et al. ............. 382/154 |
| 2011/0012990 | A1* | 1/2011 | Broberg ......................... 348/43 |
| 2011/0293170 | A1* | 12/2011 | Hatasawa et al. ............. 382/154 |
| 2012/0300027 | A1* | 11/2012 | Urisu ............................. 348/43 |

FOREIGN PATENT DOCUMENTS

| EP | 1024672 A1 | 8/2000 | |
| EP | 2239726 A1 | 10/2010 | ............... G09G 5/36 |
| JP | 2010169777 A | 8/2010 | |
| WO | WO-2010/084791 A1 * | 7/2010 | ............... G09G 5/36 |
| WO | 2011/079376 A1 | 7/2011 | ............. H04N 13/00 |
| WO | 2011098936 A2 | 8/2011 | |

OTHER PUBLICATIONS

EP111802674 Extended European Search Report dated Apr. 19, 2013 (7 pages).
Intellectual Property Office of Great Britain Search Report Application No. 1015089.4, dated Jan. 6, 2011 (3 pages).
Search Report from the United Kingdom Intellectual Property Office for Application No. 1108201.3 dated Aug. 10, 2011 (3 pages).
Office Action received in U.S. Appl. No. 13/230,729, dated Jan. 31, 2014.

* cited by examiner

*Primary Examiner* — Andrew W Johns
(74) *Attorney, Agent, or Firm* — Michael Best & Friedrich LLP

(57) ABSTRACT

To detect the presence of the left and right constituent images of a stereoscopic image packed within an image frame or within a sequence of image frames, images are unpacked according to each one of said known formats; a candidate measure is formed according to each unpacking and the candidate measures are compared to identify the presence of left and right images packed according to an identified format. The candidate measure may be a low pass filtered measure of the difference between the left and right images and may be a high pass filtered measure of the activity in either the left or the right image.

4 Claims, 10 Drawing Sheets

DETECTING STEREOSCOPIC IMAGES

FIELD OF INVENTION

This invention concerns monitoring of video material to detect the presence of stereoscopic images.

BACKGROUND OF THE INVENTION

There is increasing interest in stereoscopic television, in which a pair of images of the same scene from closely-spaced, horizontally-adjacent viewpoints are respectively presented to the left and right eyes of a viewer so as to obtain a 'three dimensional' image. One popular way of using existing transmission equipment to deliver stereoscopic images is to divide each frame into two halves and to use one half-frame for the left-eye image, and the other half-frame for the right-eye image. If the frame is divided horizontally, the horizontal scale of the two images is (approximately) halved; alternatively, if the frame is divided vertically, the vertical scale is (approximately) halved. The rescaling is, of course, reversed prior to display of the image.

This modified use of a transmission system requires careful monitoring and control to avoid presenting double images to 2D viewers, or simultaneously presenting different parts of the same image to the left and right eyes of stereoscopic viewers. There is thus great commercial utility for a system that processes image files or data and determines whether conventional two-dimensional images are being distributed, or whether, and in what manner, two component images of a stereoscopic image are being sent in the same frame. It is particularly helpful if image files or data can be monitored in this way whenever they are processed or transmitted. Therefore it is highly beneficial for the method of monitoring, and the monitoring apparatus, to be simple and inexpensive, so that the monitoring process can be included at many points in a transmission chain without undue additional cost.

SUMMARY OF THE INVENTION

The invention consists in one aspect in a method of and apparatus for detecting the presence of the left and right constituent images of a stereoscopic image packed within an image frame, or within a sequence of image frames, according to an unknown one of a plurality of known formats, comprising the steps of unpacking images according to each one of said known formats; forming a candidate measure of the difference between the left and right images or of the activity in either the left or the right image according to each unpacking and comparing said candidate measures to identify the presence of left and right images packed according to an identified format.

The candidate measure may be a measure of the difference between the left and right images which is low pass filtered.

The candidate measure may be a measure of the activity in either the left or the right image which is high pass filtered.

A motion compensated temporal filter may be used.

There is also provided a method and apparatus for detecting the presence of the two constituent images of a stereoscopic image within an image frame by analysis of columns of horizontally-averaged pixel values and rows of vertically-averaged pixel values.

In a preferred embodiment, the ordered set of values of a row of vertically-averaged pixels is analysed to detect the similarity of average values corresponding to respective image regions within the said frame horizontally separated by half the width of the said frame and the presence of a side-by-side arrangement of constituent images of a stereoscopic image is inferred from said similarity.

Suitably, the ordered set of values of a column of horizontally-averaged pixels is analysed to detect the similarity of average values corresponding to respective image regions within the said frame vertically separated by half the height of the said frame and the presence of over-and-under arrangement of constituent images of a stereoscopic image is inferred from said similarity.

Advantageously, the average difference between members of a set of a row or column of averaged pixel values is evaluated.

In some embodiments the correlation between the members of a set of a row or column of averaged pixel values is evaluated, and phase correlation may be used.

In an alternative embodiment a first row of vertically-averaged pixels is derived from the upper half of the said frame and compared with a second row of vertically-averaged pixels derived from the lower half of the said frame and the presence of over-and-under arrangement of constituent images of a stereoscopic image is inferred when these first and second rows of vertically-averaged pixels are found to be similar.

Suitably, a first column of horizontally-averaged pixels is derived from the left half of the said frame and compared with a second column of horizontally-averaged pixels derived from the right half of the said frame and the presence of side-by-side arrangement of constituent images of a stereoscopic image is inferred when these first and second rows of vertically-averaged pixels are found to be similar.

Advantageously, the average difference between respective members of a pair of rows of averaged pixels or between respective member of a pair of columns of averaged pixels is evaluated.

Alternatively, the correlation between two rows of averaged pixels or between two columns of averaged pixels is evaluated, and phase correlation may be used.

In preferred embodiments a measure of similarity between pixel values or combinations of pixel values is biased in the direction of dissimilarity when a measure of the range of values within a row or column of pixel values or combinations of pixel values is small.

In some embodiments pixels close to the edge of the said frame or close to the vertical centre line, or horizontal centre line of the said frame are disregarded.

BRIEF DESCRIPTION OF THE DRAWINGS

Examples of the invention will now be described with reference to the drawings in which.

DETAILED DESCRIPTION OF THE INVENTION

Figure 1:
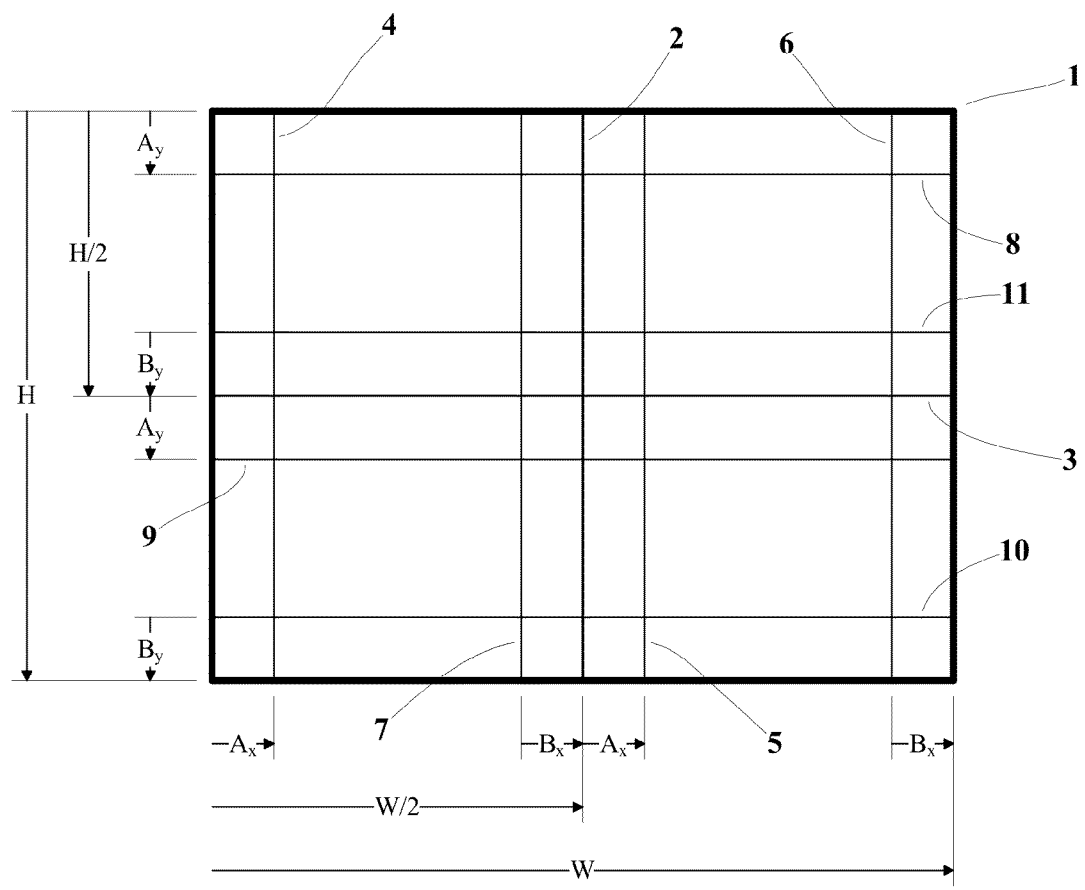
FIG. 1 shows defined regions of an exemplary image frame.

An exemplary image frame (1) is shown in FIG. 1. The frame has a width of W horizontal pixel pitches, and a height of H vertical pixel pitches. It is therefore comprised of W×H pixels each having a value (for a particular image attribute) P(x, y), where x and y are pixel position co-ordinates, in units of horizontal and vertical pixel pitches respectively, relative to a co-ordinate origin at the top left corner of the frame. Note that the y co-ordinate increases with distance down the frame, as this is the conventional direction of raster scan.

If the frame (1) is used to carry two constituent images of a stereoscopic image in 'side-by-side' format, then the portion of the frame to the left of the vertical centre-line (2) will carry one constituent image, and the portion of the frame to the right of the vertical centre-line (2) will carry the other constituent image. Alternatively, if two constituent images are carried in 'over-and-under' format, then the portion of the frame above the horizontal centre-line (3) will carry one constituent image, and the portion of the frame below the horizontal centre-line (3) will carry the other constituent image.

FIG. 1 also shows the boundaries of image-edge regions that will be ignored in certain processing that will be described below. The line (4) corresponds to the inner edge of a left-edge region, $A_x$ horizontal pixel-pitches wide; and, the line (5) corresponds to the inner edge of the left-edge region of an image occupying the right-hand half of the frame. The inner boundaries of equivalent right-edge regions, $B_x$ horizontal pixel-pitches wide, for the frame and the left-hand half of the frame, are shown by the lines (6) and (7) respectively.

The boundaries of equivalent top-edge regions, $A_y$ vertical pixel-pitches wide, for the frame and the bottom half of the frame are shown by the lines (8) and (9) respectively. And, the boundaries of equivalent bottom-edge regions, $B_y$ vertical pixel-pitches wide, for the frame and the bottom half of the frame are shown by the lines (10) and (11) respectively.

Although the two constituent images of a 'stereo pair' of images are taken from different viewpoints, the close proximity of these viewpoints results in significant similarity between the respective images. The identification of stereoscopic material is thus possible by evaluating the correlation between the pixel values of the left and right sides of the frame, and the correlation between the pixel values of the top and bottom halves of the frame. However, the calculation of two-dimensional cross-correlation functions, possibly requiring multi-dimensional transforms of sets of pixel values, requires significant processing resources. This approach is generally not cost-effective when monitoring large numbers of video data streams or files at many points in a distribution chain.

The inventor has appreciated that over-and-under and side-by-side stereoscopic material can be identified by simple processing applied to one or two rows of vertically averaged pixel values and one or two columns of horizontally averaged pixel values derived from each frame.

A suitable row, that is representative of the horizontal variation of pixel values, and comprises W values is given by:

$$R(x) = (1/H) \times \Sigma P(x,y) \quad [1]$$

Where:
H is the height of the frame in vertical pixel pitches;
P(x, y) is the value of the pixel at Cartesian co-ordinates (x, y); and,
the summation is made over the full frame height comprising the range 0≤y≤(H−1).

A suitable column, that is representative of the vertical variation of pixel values, and comprises H values is given by:

$$C(y) = (1/W) \times \Sigma P(x,y) \quad [2]$$

Where:
W is the width of the frame in horizontal pixel pitches; and,
The summation is made over the full frame width comprising the range 0≤x≤(W−1).

Note that, in each case, the division by the height or width respectively gives similarity in the number range to be processed regardless of the size of the frame.

One method of detecting constituent images of a stereoscopic image is to evaluate two, one-dimensional cross-correlation parameters:

(a) the cross-correlation between the ordered set of horizontally averaged pixel values taken from the top half of the frame, above the horizontal centre line (3), and the corresponding ordered set of horizontally-averaged pixel values taken from the bottom half of the frame, below the horizontal centre line (3); and, (b) the cross-correlation between the ordered set of vertically averaged pixel values taken from the left half of the frame, to the left of the vertical centre line (2), and the corresponding ordered set of vertically-averaged pixel values taken from the right half of the frame, to the right of the vertical centre line (2).

If only one of these two cross-correlation evaluations returns a high measure of correlation, then over-and-under carriage of stereo can be detected if measure (a) is high and measure (b) is low; and, side-by-side carriage of stereo can be detected if measure (b) is high and measure (a) is low. If neither measure shows high correlation, then the absence of stereoscopic component images can be detected.

The correlation can be evaluated mathematically from the known cross-correlation integral, derived either: in the spatial domain by convolution of the two sets of pixel values taken from different halves of the image; or, in the frequency domain from respective one-dimensional transforms of the sets of pixel values. A suitable frequency domain technique is the known method one-dimensional phase-correlation where the phases of respective frequency components are compared and the set of phase differences is transformed from the frequency domain back to the spatial domain and analysed to detect peaks.

Figure 2:
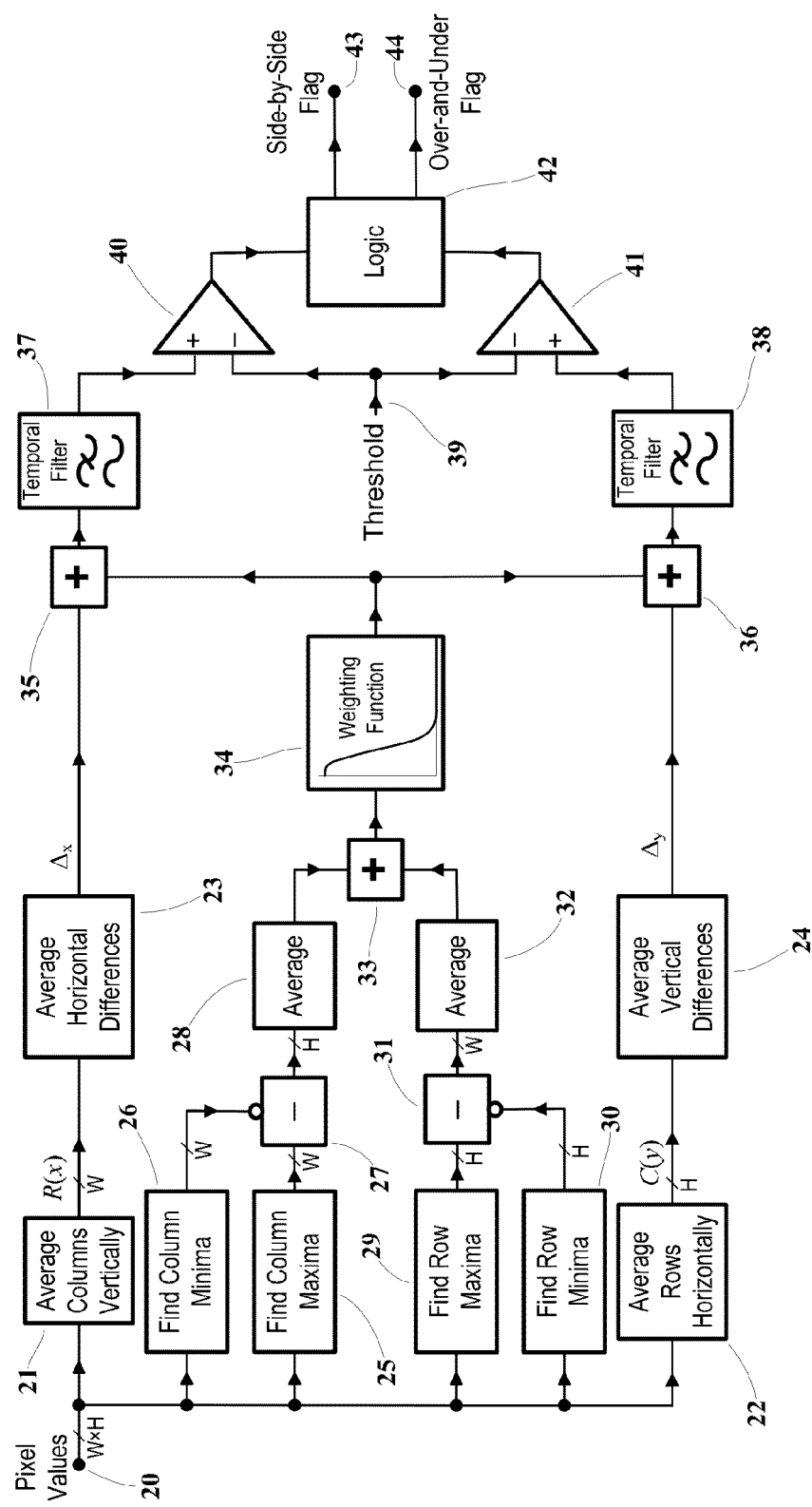
FIG. 2 shows a block diagram of a process according to an embodiment of the invention.

Alternatively pixel-value differences can be evaluated to detect correlation between halves of the frame. This is much simpler than the above correlation methods and therefore more cost effective for a system that requires many different image files or streams to be monitored at many different locations. A system using this principle to analyse an array of pixel values to detect the presence of two component images of a stereo pair is shown in FIG. 2. A set of pixel values is input to the system at terminal (20). The set comprises H horizontal rows of W pixels, and W vertical columns of H pixels, making a total of W×H pixel values.

Vertical columns of pixel values are respectively averaged according to equation [1] above by an averager (21) to give a row of W average values R(x). And, horizontal rows of pixel values are respectively averaged according to equation [2] above by a second averager (22) to give a column of H average values C(y).

The magnitudes of the differences between pairs of values from the row of average values R(x) that are separated by half the image width are evaluated and averaged in a horizontal difference averager (23) according to equation [3] below:

$$\Delta_x = G \times \Sigma\{R(x) - R(x+W/2)\} \div (W/2 - A_x - B_x + 1) \quad [3]$$

Where:

$\Delta_x$ is an average horizontal-difference measure;
G is a constant chosen to give a convenient number range;
The summation is made over the range: $A_x \leq x \leq (W/2 - B_x - 1)$; and,
$A_x$ and $B_x$ are constants defining image edge regions (as shown in FIG. 1).

The horizontal-difference measure $\Delta_x$ is thus a measure of the average difference between respective, vertically-averaged columns of pixels at equivalent horizontal positions in the left and right halves of the frame. Image edge regions, including the edges of constituent stereo images filling half of the frame, are prevented from contributing to the difference measure by suitable choice of the constants $A_x$ and $B_x$.

Similarly, the magnitudes of the differences between pairs of values from the column of average values C(y) that are separated by half the image height are evaluated and averaged in a vertical-difference averager (24) according to equation [4] below:

$$\Delta_y = G \times \Sigma\{C(y) - C(y+H/2)\} \div (H/2 - A_y - B_y + 1) \quad [4]$$

Where:

$\Delta_y$ is an average vertical-difference measure;
The summation is made over the range: $A_y \leq y \leq (H/2 - B_y - 1)$; and,
$A_y$ and $B_y$ are constants defining image edge regions (as shown in FIG. 1).

The vertical-difference measure $\Delta_y$ is thus a measure of the average difference between respective, horizontally-averaged rows of pixels at equivalent vertical positions in the top and bottom halves of the frame. Image edge regions, including the edges of constituent stereo images filling half of the frame, are prevented from contributing to the difference measure by suitable choice of the constants $A_y$ and $B_y$.

A suitable value for the constant G is 8, for typical 8-bit pixel values; and, 10 is a suitable value for the constants $A_x$, $A_y$, $B_x$ and $B_y$.

When the whole frame is filled with a typical single image, it is unlikely that the left and right halves of the frame will be similar, and also unlikely that the top and bottom halves of the frame will be similar; both $\Delta_x$ and $\Delta_y$ can therefore be expected to be large.

If the frame is used for over-and-under transmission of the two constituent images of a stereoscopic image, the horizontal-difference measure can be expected to be large because the respective left and right halves of the constituent images are likely to be different. However, the vertical-difference measure is very likely to be small because the left-eye and right-eye views of a scene are acquired by cameras at the same height.

Alternatively, if the frame is used for side-by-side transmission of the two constituent images of a stereoscopic image, the vertical-difference measure can be expected to be large because the top and bottom halves of the constituent images are likely to be different. However, the horizontal difference measure is likely to be small—but not zero, because of the horizontal disparity between the left-eye and right-eye positions of objects intended to be portrayed in front of, or behind, the display.

Thus, provided the frame contains images having varying pixel values, it should be possible to detect whether or not side-by-side or over-and-under representation of stereoscopic is being used. However, if the pixel values do not vary over the image, perhaps following a fade to black, both difference measures will be zero and detection stereo images will not be possible. This difficulty can be avoided by adding a correction factor to the difference measures as will now be described.

The maximum pixel-value for each of the W columns of pixels is determined by a maximum value detector (25); and, the minimum value for each of the W columns of pixels is determined by a minimum value detector (26). The respective differences between these maxima and minima are then calculated by a subtractor (27) to give a set of W pixel-value range values according to equation [5] below:

$$\text{Range}(x) = \{\text{Max}(P(x,y)) - \text{Min}(P(x,y))\} \quad [5]$$

Where:
$\text{Max}(P(x, y)) = \text{Max}\{P(x, 0), P(x, 1), P(x, 2), \ldots P(x, H-1)\}$; and,
$\text{Min}(P(x, y)) = \text{Min}\{P(x, 0), P(x, 1), P(x, 2), \ldots P(x, H-1)\}$ These range values are averaged over the frame width in an averager (28) to give an average column range value according to equation [6] below:

$$\text{Range}_{Col} = (1/W) \times \Sigma\{\text{Range}(x)\} \quad [6]$$

Where: The summation is over the range $0 \leq x \leq (W-1)$.

Analogous processing is applied to the H rows of pixel values to obtain an average row range value as follows. The maximum value of each of the rows of pixels is determined by a maximum value detector (29); and the minimum value of each of the rows of pixels is determined by a minimum-value detector (30). A subtractor (31) determines the set of H range values according to equation [7] below:

$$\text{Range}(y) = \{\text{Max}(P(x,y)) - \text{Min}(P(x,y))\} \quad [7]$$

Where:
$\text{Max}(P(x, y)) = \text{Max}\{P(0, y), P(1, y), P(2, y), \ldots P(W-1, y)\}$; and,
$\text{Min}(P(x, y)) = \text{Min}\{P(0, y), P(1, y), P(2, y), \ldots P(W-1, y)\}$ These range values are averaged over the frame height in an averager (32) to give an average row range value according to equation [8] below:

$$\text{Range}_{Row} = (1/H) \times \Sigma\{\text{Range}(y)\} \quad [8]$$

Where: The summation is over the range 0 y (H−1).

The two average range values, $\text{Range}_{Col}$ and $\text{Range}_{Row}$ are summed in an adder (33) to give an overall measure of the variation in pixel values for the image. The output from the adder (33) will be small when there is little variation in the values of pixels over the image; in this situation low values of $\Delta_x$ and $\Delta_y$ give unreliable indication of the presence of stereoscopic images, as explained above. The output from the adder (33) is input to a weighting function (34) to obtain dynamic range correction factor that is added to $\Delta_x$ and $\Delta_y$. This correction factor should be small when the range of pixel values sufficiently large to give representative values of $\Delta_x$ and $A_y$, and become large otherwise. A suitable weighting function is:

$$\delta = J \times \exp(-(z/K)^2) \quad [9]$$

Where:
$\delta$ is the dynamic range correction factor to be added to $\Delta_x$ and $\Delta_y$;
Z is the un-weighted input range value; and,
J and K are constants.

The value of J sets the maximum value of $\delta$ when the input range z is zero; a value of 120 has been found to be suitable.

The value of K determines how rapidly the weighting decreases as the input range z increases; a value of 2048 has been found suitable.

Returning to FIG. 2, the dynamic range correction factor output from the weighting function (34) is added to the horizontal difference measure $\Delta_x$ in an adder (35), and also added to the vertical difference measure $\Delta_y$ in and adder (36). When, as is usually the case, a sequence of images is being analysed, the output from the adders (35) and (36) are temporally filtered in respective temporal filters (37) and (38) that, typically, recursively combine the results from a number of images. The two filtered difference measures are compared with a common threshold value (39) in respective comparators (40) and (41) to provide binary TRUE or FALSE inputs to a logic block (42) that derives output 'side-by-side' and 'over-and-under' flags (43) and (44).

Frames carrying the two constituent images of a stereo image will usually result in one of the comparator outputs being TRUE and the being other FALSE. Frames carrying a single image will usually result in both comparators giving TRUE outputs because both the horizontal difference measure $\Delta_x$ and the vertical difference measure $\Delta_y$ are above the threshold. Thus the FALSE condition at the output of the comparator (40) is indicative of side-by-side constituent images; and the FALSE condition at the output of the comparator (41) is indicative of over-and-under constituent images.

The logic block (42) ensures that the output flags (43) and (44) are mutually exclusive, and provides additional temporal averaging when processing sequences of images. A suitable algorithm for this latter case is to count the number of frames for which each of the comparators (40) and (41) give FALSE outputs over, say, 200 frames and to set the output flag corresponding to the comparator giving the higher number of FALSE outputs exceeding a suitable threshold number, say 50. Thus if the comparator (40) gives a FALSE output for more than 50 frames in the last 200 frames, and the comparator (41) gives fewer FALSE outputs for these frames, then the side-by-side flag (43) is set. And, similarly if the comparator (41) gives a higher number of FALSE outputs exceeding 50 for these frames, and the comparator (40) gives a fewer number of FALSE outputs, then the over-and-under flag (44) is set. If neither comparator gives more than 50 FALSE outputs in the most recent 200 frames, then neither output flag is set.

This logical processing can be improved by making use of the $\Delta_x$ and $\Delta_y$ values from the vertical-difference averager (23) and the horizontal-difference averager (24) when neither of the comparators (39) and (40) gives more than 50 FALSE outputs in the most recent 200 frames. The $\Delta_x$ and $\Delta_y$ values can be summed respectively over these 200 frames and the respective summations compared both with each other and with a threshold value, say 14,000. If the lower sum is less than the threshold, the appropriate flag is set; neither flag is set if both sums exceed the threshold. Other variations in this logic are possible, for example different thresholds can be set for the two comparisons, and the thresholds may depend on the currently detected flags so as to provide hysteresis that prevents a change in an output flag until a significant change in the measured horizontal or vertical difference values occurs.

The system shown in FIG. 2 uses one row of vertically averaged pixel values R(x), and one column of horizontally averaged pixel values C(y) derived from all of the frame. Detection of side-by-side and over-and-under transmission of stereoscopic images can alternatively be achieved by analysing two rows of vertically averaged pixel values and two columns of horizontally averaged pixel values derived from separate averaging of half-frames as follows:

$$R_{Upper}(x)=(2/H)\times\Sigma P(x,y) \quad [10]$$

Where: the summation is made over the upper half of the frame comprising the range $0 \leq y \leq (H/2-1)$.

$$R_{Lower}(x)=(2/H)\times\Sigma P(x,y) \quad [11]$$

Where: the summation is made over the lower half of the frame comprising the range $(H/2) \leq y \leq H$.

$$C_{Left}(y)=(2/W)\times\Sigma P(x,y) \quad [12]$$

Where: the summation is made over the left half of the frame comprising the range $0 \leq x \leq (W/2-1)$.

$$C_{Right}(y)=(2/W)\times\Sigma P(x,y) \quad [13]$$

Where: the summation is made over the right half of the frame comprising the range $(W/2) \leq x \leq W$.

The presence of over-and-under stereoscopic images can be inferred when the correlation between $R_{Upper}(x)$ and $R_{Lower}(x)$ is high, and the correlation between $C_{Left}(y)$ and $C_{Right}(y)$ is low.

Similarly, the presence of side-by-side stereoscopic images can be inferred when the correlation between $C_{Left}(y)$ and $C_{Right}(y)$ is high, and the correlation between $R_{Upper}(x)$ and $R_{Lower}(x)$ is low.

The complexity of correlation processing can be avoided by forming average horizontal and vertical pixel value difference measures as follows:

$$\Delta_x'=G\times\Sigma\{C_{Left}(y)-C_{Right}(y)\}\div(H-A_y-B_y+1) \quad [14]$$

Where:

$\Delta_x'$ is an alternative average horizontal-difference measure; and

The summation is made over the range: $A_y \leq y \leq (H-B_y-1)$.

And:

$$\Delta_y'=G\times\Sigma\{R_{Upper}(x)-R_{Lower}(x)\}\div(W-A_x-B_x+1) \quad [15]$$

Where:

$\Delta_y'$ is an alternative average vertical-difference measure;

The summation is made over the range: $A_x \leq x \leq (W-B_x-1)$.

The presence of over-and-under stereoscopic images can be inferred when A; is low, and $\Delta_x'$ is high. Similarly, the presence of side-by-side stereoscopic images can be inferred when $\Delta_x'$ is low, and $\Delta_y'$ is high. As in the system of FIG. 2, a dynamic range correction factor, derived from the range of values in the averaged rows and columns of pixel values can be added to the horizontal- and vertical-difference measures to avoid false detection in the absence of representative image data.

The operations of taking averages and of taking differences may in appropriate cases be reversed in order.

The side-by-side and over-under formats described previously are examples of "loose-packed" formats in which the left and right images occupy substantially separate spatial locations.

Two further examples of loose-packed formats are "side-by-side reflected" and "over-under reflected" in which one of the two images is reflected in the direction in which the images are juxtaposed. Such formats may be encountered when the original image source is a 'mirror-rig', in which the viewpoint of one of the pair of cameras is shifted by the use of a mirror.

Figure 3:
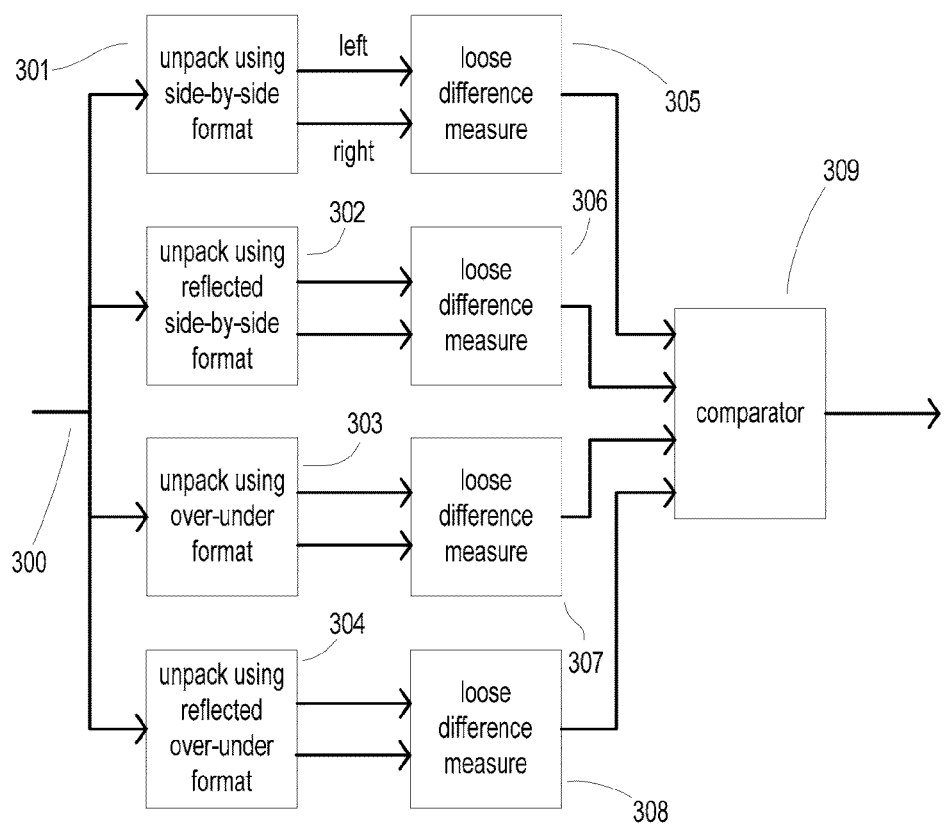
FIG. 3 shows a block diagram of a process according to another embodiment of the invention.
Figure 4:
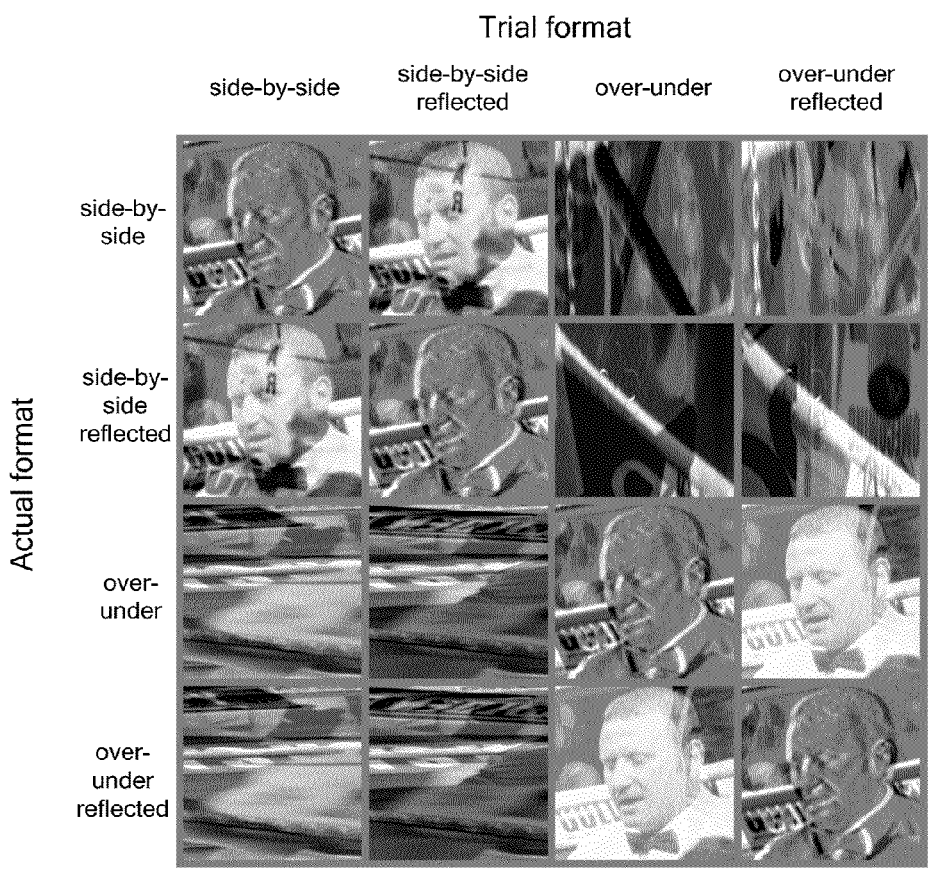
FIG. 4 shows pictorially the effect of unpacking various loose-packed images using different trial formats.

FIG. 3 shows a block diagram of a process capable of distinguishing between the four loose-packed formats already defined. The input frame (300) is unpacked—that is to say it is separated into its two constituent images according to the respective packing structure—in parallel in four unpacking blocks (301) (302) (303) (304), each of which is designed to unpack one of the four formats. This unpacking process is re-sampling process and will usually involve interpolation of additional pixel values by an interpolation filter. The left and right images produced by one of the four blocks will be correct, while in the other three blocks the left and right images will contain significant information from unrelated parts of the picture. This is illustrated in FIG. 4, which shows the difference between left and right images in a small area of a picture, for each combination of actual input format and trial format used for unpacking. Where the correct unpacking format is used, the difference is due only to the disparity between left and right images, whereas when the incorrect format is used, the difference is taken between two unrelated areas of the picture.

Figure 5:
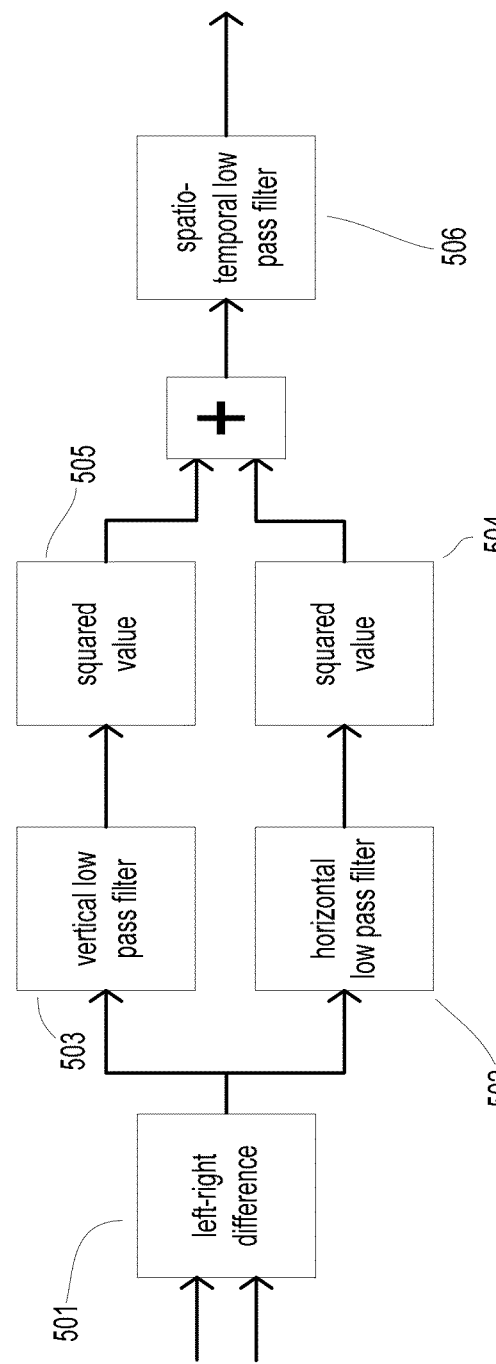
FIG. 5 gives more detail of the "loose difference measure" step of FIG. 3.

In order to determine automatically which of the four unpacking blocks (301) to (304) has yielded the correct result, the image pair from each unpacking block is passed to a respective "loose difference measure" evaluation block (305) to (308). These are identical and an example is shown in FIG. 5. The outputs from each loose difference measurement block are compared in a comparator (309) and the lowest value indicates which of the four formats has been used.

We now describe the loose difference measure evaluation blocks (305) to (308) in more detail. Referring to FIG. 5, the pixel value difference between left and right images is determined (501) and passed to horizontal (502) and vertical (503) low-pass filters, and squared values taken of each output in squared value blocks (504) and (505). The squared values are then added together and passed to a spatio-temporal low-pass filter (506) which calculates a weighted sum of pixel values, which could be an average value or a more complex spatio-temporal filter aperture. The loose difference measure will return a low value when the only difference between the left and right input images is due to stereoscopic disparity and a much higher value when the two inputs are from completely different parts of the picture, as is the case when the wrong unpacking format is being used.

This same approach of unpacking according to trial formats and comparing a measure of left-right difference can also be applied where the only candidate formats are side-by-side and over-under. In the arrangement shown in FIG. 2, the two trial formats are effectively hard-wired into the logic which creates the average differences. Extending this approach to more than two trial formats would increase complexity but may still be appropriate. It may also be appropriate to use in one approach the techniques for forming differences which are exemplified here using the other approach.

It is also common for 3D material to be distributed in "close-packed" formats, in which the samples of the left and right images are closely interleaved.

We now describe a process capable of distinguishing between three examples of "close-packed" formats: column interleaving, where left and right images occupy alternate columns of the packed image; line interleaving, where left and right images occupy alternate lines of the packed image; and, checkerboard interleaving, where left and right images each have a quincunx sampling structure, and are interleaved in a checkerboard pattern.

Figure 6:
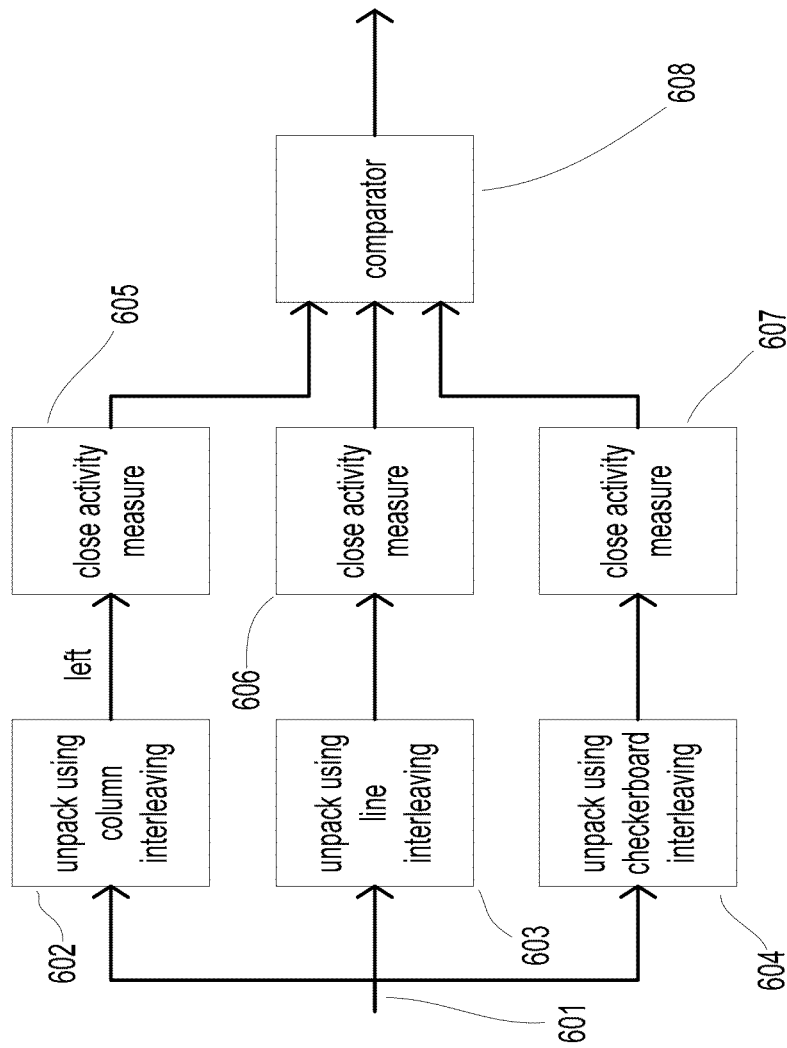
FIG. 6 shows a block diagram of a process according to another embodiment of the invention.
Figure 7:
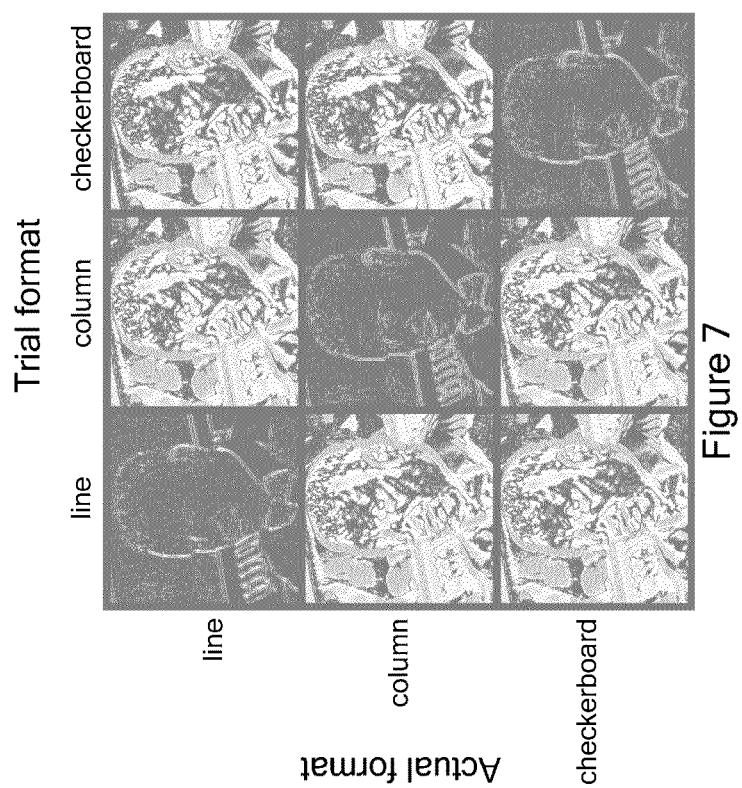
FIG. 7 shows pictorially the effect of unpacking various close-packed images using different trial formats.
Figure 8:
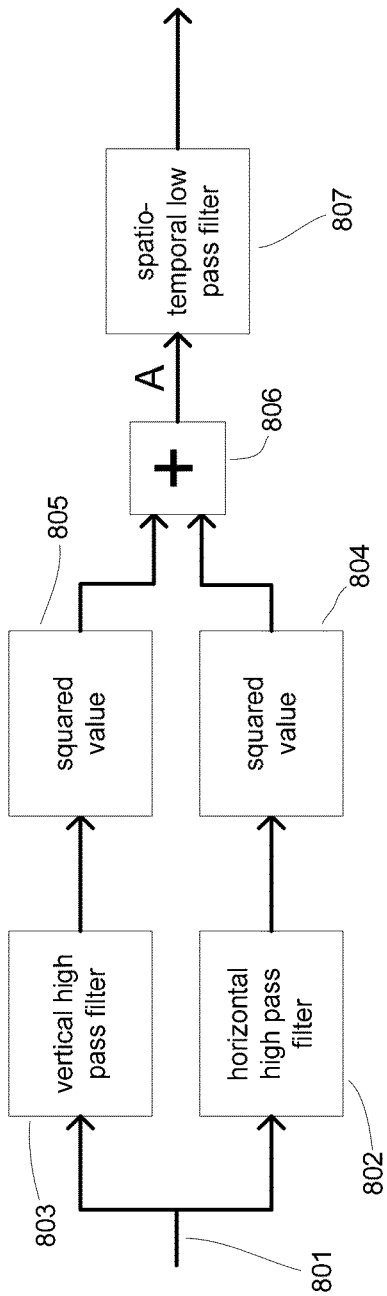
FIG. 8 gives more detail of the "close activity measure" step of FIG. 6.

Referring to FIG. 6, the input frame (601) is unpacked in three unpacking blocks (602) (603) (604), each of which is designed to unpack one of the three close-packed formats. Only the left (or right) output from each the unpacking blocks is used in subsequent processing. Each of the three left outputs is passed to a respective "close activity measure" block (605) (606) (607). These are identical and an example is shown in FIG. 8. If the correct unpacking format is used, the close activity will contain only the high spatial frequencies from the left channel, which typically have low energy, whereas if the incorrect format is used, the close activity will be dominated by disparity between the left and right images, which typically has higher energy. This is illustrated in FIG. 7, which shows the close activity (at point A in FIG. 8) for each combination of actual input format and trial format used for unpacking. The outputs from each close activity measurement block (605) to (607) are compared in a comparator (608) and the lowest value indicates which of the three formats has been used.

We now describe the close activity measure in more detail. Referring to FIG. 8, the input image (801) is passed to horizontal (802) and vertical (803) high-pass filters and the filter outputs are squared in respective squarers (804) (805). The squared values are then added together (806) and passed to a spatiotemporal low pass filter (807), which calculates an average value, or a more complex low-pass filter function. This close activity measure will return a low value when the only activity is that of the left picture and a much higher value when the activity includes stereoscopic disparity.

We now describe how the process presented above may be adapted to include the detection of a time-interleaved packing format where each constituent image of the stereo pair is spatially sampled over the whole frame in the conventional manner, but succeeding frames are from different viewpoints. Time interleaving is a further example of a close-packed format, but it differs from the three formats already described in that temporally adjacent pixels of an image sequence are typically not close in value if there is significant motion. The system of FIG. 8 cannot be used to identify this format because the output of a temporal-high pass filter, which would be used in parallel with (or in place of) the vertical and horizontal high-pass filters (802) (803), would produce an unwanted output for moving sequences that would not indicate the presence of a stereo pair of images. This problem can be overcome by introducing motion compensation to the temporal high pass filter whereby motion is measured and pixels are shifted according to measured motion vectors prior to being combined in the filter aperture. We would expect that in most areas of the picture the output of a temporal high-pass filter applied to a single channel of a stereoscopic pair would be low. It is important that the motion measurement used for this task should be performed on an image sequence that is known to be from the left (or right) channel only. This can be assured by subsampling the close-packed input signal by a factor of 2 in all three dimensions: vertically, horizontally and temporally. The subsampled signal will contain information from one channel only, regardless of which close-packed format has been used.

Figure 9:
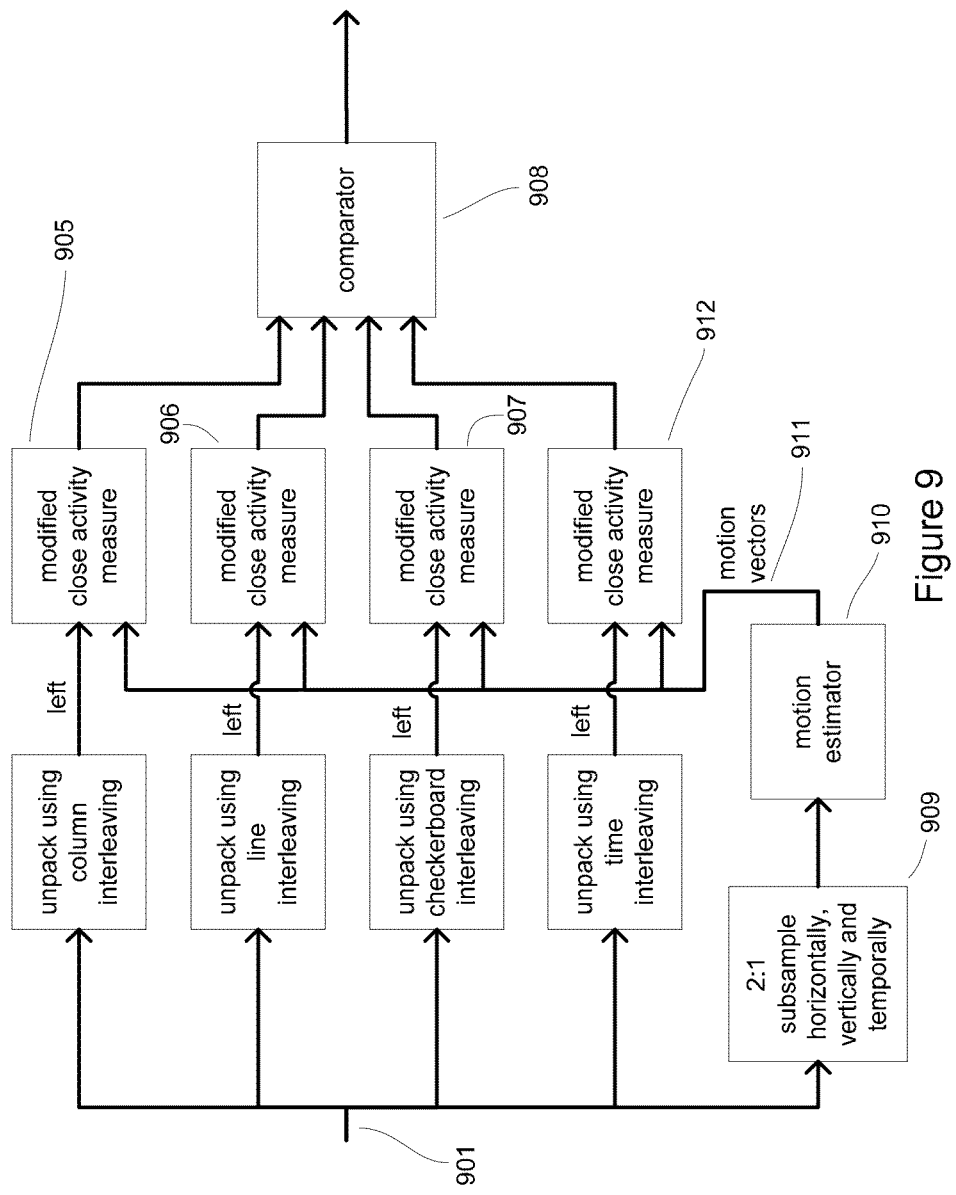
FIG. 9 shows a block diagram of a process according to another embodiment of the invention.
Figure 10:
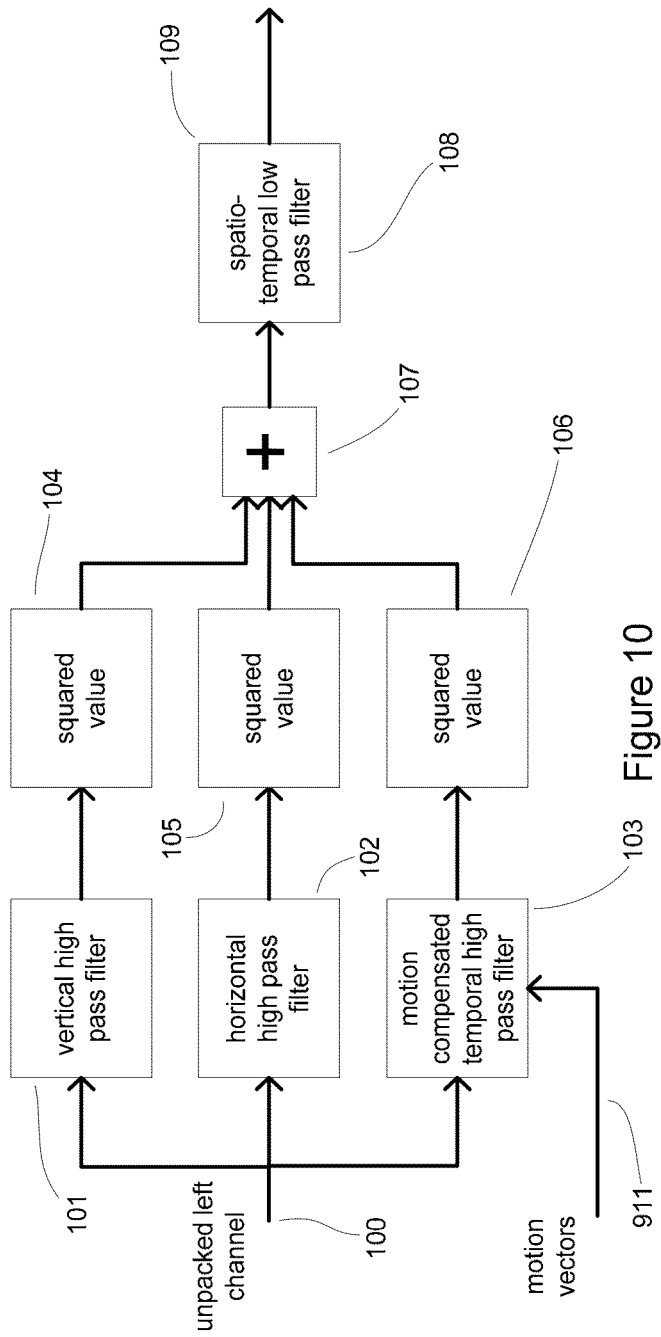
FIG. 10 gives more detail of the "modified close activity measure" step of FIG. 9.

A modified version of the close-packed detection process, including temporal interleaving, is shown in FIGS. 9 and 10. FIG. 9 is a top-level diagram and FIG. 10 shows the modified version of the close activity measure.

Referring to FIG. 9 the structure of FIG. 6 has been modified by the addition of a 2:1 sub-sampler (909), that sub-samples the input images (901) horizontally, vertically and temporally. The sub-sampled output is input to a motion estimator (910) that derives motion vectors (911) for the pixels of the input images that describe the positional changes of portrayed objects between succeeding frames. The motion vectors (911) are input to close activity measurement blocks (905) to (907) and (912), each of which has the structure shown in FIG. 10. Because the motion vectors have been derived from sub-sampled images it may be necessary for them to be re-scaled before use.

Referring to FIG. 10, each unpacked left image (100) is input to a vertical high-pass filter (101), a horizontal high-pass-filter (102) and a motion-compensated temporal high-pass filter (103). The temporal filter (103) receives motion vectors (911) that are output from the motion estimator (910) shown in FIG. 9. The temporal filter (103) compares pixels in succeeding images that have been shifted according to their respective motion vectors so that differences due to motion are not output. The output from each of the high-pass filters (101) (102) and (103) is input to a respective squarer (104) (105) (106) and the outputs of the three squarers are summed (107) and input to a spatio-temporal low-pass filter (108), whose output (109) forms the respective input to the comparator (908) shown in FIG. 9.

Thus it can be seen from the above explanation that the system of FIG. 3 can be used to distinguish loose-packed 3D formats from conventional 2D images; and, to distinguish between the four described close-packed formats. If all of the inputs to the comparator (309) show significant difference-measure values, then the input is highly likely to be 2D. And, if one of the comparator inputs is close to zero and all the other show significant difference measure values then 3D with the packing method corresponding to the low difference-measure is highly likely to be present.

Close-packed 3D formats are more difficult to distinguish from 2D. However the systems of FIG. 6 and FIG. 9 can be used to distinguish between different close-packed 3D formats, because the one of the inputs to the comparator (608) or (908) will be close to zero, and that input will have been derived from the unpacking method that corresponds to the packing method of the input.

In appropriate cases, any one system may unpack according to different groupings of trial formats from those groupings exemplified in FIGS. 3, 6 and 9.

Left-right differences taken from the unpacking schemes may be filtered in ways other than those specifically described. The described separate horizontal and vertical filters may be used as alternatives, may be combined or may in appropriate cases be omitted. The low and high pass filters may be replaced with targeted band pass filters. The squaring function may be replaced by a magnitude or rectifying function. Averaging or sub sampling may occur at various points in the signal chain.

The invention can be applied to sets of values that describe any convenient image attribute at a respective set of pixel locations; or, to sets of combined pixel values where each member of the set is formed by combining the values for different image attributes at the same pixel location. Typically luminance values are used but other pixel values may be employed. Images may be subsampled or oversampled prior to processing. Image-edge values, including values close to the horizontal or vertical centre lines of the image, may or may not be included in any of the summation and averaging processes. The invention can be applied to single frames or sequences of frames; of course the temporal filtering of horizontal difference values and the summation of values over multiple frames cannot be applied when processing unrelated images. The above description has been in terms of hardware blocks, other implementations, including processor-based implementations are possible, and will be apparent to the skilled person from the above description.

The invention claimed is:

1. A method of detecting the presence of the left and right constituent images of a stereoscopic image packed within an image frame or within a sequence of image frames, according to an unknown one of a plurality known formats, the method comprising the steps in a processor of
    unpacking images according to each one of said known formats; forming a candidate measure according to each unpacking; and comparing said candidate measures to identify the presence of left and right images packed according to an identified format,
    wherein said candidate measure is a measure of the difference between the left and right images and wherein said measure of the difference between the left and right images is low pass filtered.

2. A method of detecting the presence of the left and right constituent images of a stereoscopic image packed within an image frame or within a sequence of image frames, according to an unknown one of a plurality known formats, the method comprising the steps in a processor of
    unpacking images according to each one of said known formats;
    forming a candidate measure according to each unpacking; and
    comparing said candidate measures to identify the presence of left and right images packed according to an identified format,
    wherein said candidate measure is a measure of the activity in either the left or the right image.

3. A method according to claim 2, wherein said measure of the activity in either the left or the right image is high pass filtered.

4. A method of detecting the presence of the left and right constituent images of a stereoscopic image packed within an image frame or within a sequence of image frames, according to an unknown one of a plurality known formats, the method comprising the steps in a processor of
    unpacking images according to each one of said known formats;
    forming a candidate measure according to each unpacking and
    comparing said candidate measures to identify the presence of left and right images packed according to an identified format, in which motion compensated temporal filter is used.

* * * * *